(12) United States Patent
Merritt

(10) Patent No.: US 9,392,905 B2
(45) Date of Patent: Jul. 19, 2016

(54) VENTED CHIMNEY CAP ASSEMBLY

(71) Applicant: Matthew H. Merritt, Ponte Vedra Beach, FL (US)

(72) Inventor: Matthew H. Merritt, Ponte Vedra Beach, FL (US)

(73) Assignee: SMOKEWARE.NET LLC, Jacksonville Beach, FL (US)

( * ) Notice: Subject to any disclaimer, the term of this patent is extended or adjusted under 35 U.S.C. 154(b) by 435 days.

(21) Appl. No.: 13/773,769

(22) Filed: Feb. 22, 2013

(65) Prior Publication Data

US 2013/0225057 A1 Aug. 29, 2013

Related U.S. Application Data

(60) Provisional application No. 61/602,428, filed on Feb. 23, 2012.

(51) Int. Cl.
*F23J 13/08* (2006.01)
*A47J 37/07* (2006.01)
*A47J 36/38* (2006.01)

(52) U.S. Cl.
CPC .............. *A47J 37/0786* (2013.01); *A47J 36/38* (2013.01)

(58) Field of Classification Search
CPC ......... A47J 37/0786; A47J 36/38; F23J 13/00
USPC ............................................ 126/25 R; 454/5
See application file for complete search history.

(56) References Cited

U.S. PATENT DOCUMENTS

| | | | | | |
|---|---|---|---|---|---|
| 941,900 | A | * | 11/1909 | Wood | 126/312 |
| 2,823,599 | A | * | 2/1958 | Still | 454/22 |
| 2,851,941 | A | * | 9/1958 | Cogar | A47B 31/02 126/25 A |
| 3,699,876 | A | * | 10/1972 | Ellis | A47J 37/0704 126/25 R |
| 4,649,808 | A | * | 3/1987 | Ward et al. | 454/17 |
| 5,180,331 | A | * | 1/1993 | Daw | F24F 13/068 454/187 |
| 5,325,841 | A | * | 7/1994 | Hooper, Sr. | A47J 37/0704 126/25 R |
| 5,404,801 | A | * | 4/1995 | Holland | 99/482 |
| 5,865,099 | A | * | 2/1999 | Waugh | A47F 37/0786 126/25 R |
| 6,470,875 | B2 | * | 10/2002 | Liu | 126/25 R |
| D473,414 | S | * | 4/2003 | Neal et al. | D7/332 |
| 6,606,986 | B2 | * | 8/2003 | Holland et al. | 126/25 R |
| 7,984,709 | B1 | * | 7/2011 | Byrnes | A47J 37/0704 126/25 R |
| 2002/0179081 | A1 | * | 12/2002 | Holland et al. | 126/25 R |
| 2006/0213497 | A1 | * | 9/2006 | Orozco et al. | 126/41 R |
| 2006/0246833 | A1 | * | 11/2006 | Arnold, Jr. | E04F 17/026 454/12 |
| 2009/0308373 | A1 | * | 12/2009 | Scott et al. | 126/25 R |
| 2011/0283990 | A1 | * | 11/2011 | Walters et al. | 126/25 R |

* cited by examiner

*Primary Examiner* — Steven B McAllister
*Assistant Examiner* — Jonathan Cotov
(74) *Attorney, Agent, or Firm* — Mark Young, P.A.

(57) ABSTRACT

An outdoor grill adjustable vented chimney cap assembly having a tubular base member with vent openings and a cap member having a cover member and a tubular body with vent openings, the base member being adapted to be mounted onto the chimney of a grill, the cap member being mounted onto the base member whereby the cap member can be rotated relative to the base member such that base vent members can be adjusted to control the amount of hot gases escaping from the grill.

18 Claims, 2 Drawing Sheets

VENTED CHIMNEY CAP ASSEMBLY

This application claims the benefit of U.S. Provisional Patent Application Ser. No. 61/602,428, filed Feb. 23, 2012, the disclosure of which is incorporated herein by reference.

BACKGROUND OF THE INVENTION

This invention relates generally to the field of vented chimney caps and in particular to such caps having adjustable vents. Even more particularly the invention relates to such caps adapted for use on outdoor cooking grills having a curved or rounded cover and a short chimney stack.

Outdoor cooking grills, both portable and non-portable, are well known and utilize charcoal, wood, propane or electricity to produce heat for cooking food, the food being positioned on a grating or within a container disposed above the heat source. The grills typically have a hinged or removable cover or lid, such that the grill can be utilized in a closed mode wherein the heat is retained within the grill and the food is exposed to heat on all sides, or in an open mode wherein only the underside of the food is exposed to heat. In the closed mode the temperature within the grill can easily reach 400-500 degrees F.

In most grills the cooking temperature is controlled solely by adjusting the heat source, e.g., removing or adding charcoal, increasing or decreasing the gas flow, etc., since the covers are only positionable in either a fully closed or fully open status. Other grills, such as for example some larger smoker grills and the egg-shaped grills sold under the brand THE GREEN EGG, have a small diameter chimney positioned in the cover to allow heated air and smoke to escape from the interior of the grill. It is known to provide such chimneys with adjustable vented structures such that the amount of heated air escaping from the closed grill can be adjusted as desired.

It is an object of this invention to provide an improved adjustable vented chimney cap assembly or device.

SUMMARY OF THE INVENTION

The invention is a vented chimney cap assembly or device wherein the vent openings may be adjusted from fully open to completely closed. The vented chimney cap assembly is designed and structured to be used in conjunction with an outdoor grill of the type possessing a curved or rounded removable or hinged cover having an annular chimney or smokestack.

The vented chimney cap assembly comprises a base member in combination with a cap member. The base member comprises a tubular body open at the top and bottom. The bottom end may be outwardly flared or curved to better match the configuration of the rounded grill cover. One or more vent openings are provided in the wall of the base member. The cap member comprises a tubular body having an open bottom and a top cover member, preferably sloped or curved and having a larger diameter than the cap main body in order to shed rain water. The tubular body of the cap member is also provided with vent openings. The cap member is sized to have either a slightly larger or slightly smaller diameter than the base member tubular body, whereby the cap member can be seated onto the base member such that the cap member is external to the base member or such that the base member is external to the cap member. Because the cap member and the base member are tubular, the cap member may be rotated relative to the base member. The cap member is preferably removable from the base member for ease of cleaning and to provide a large outlet for smoke and hot gases, which may be especially useful during start-up.

The vent openings on the cap member and the base member are aligned whereby rotation of the cap member adjusts the size of the open area of the combined vent openings. The cap member may be rotated relative to the base member such that combined open area is maximized or reduced, or may be rotated to be fully closed with no open area for the escape of heated air. A handle or tab member may be provided on the side of the vent cap tubular body for easier rotation.

The open bottom of the base member fits over the chimney or smokestack of the grill. The base member of the vented chimney cap assembly may be permanently or removably installed on the grill. The base member may be sized to snuggly receive the grill chimney to create a friction fit, may be affixed using mechanical fasteners, may be secured by welding, soldering or the use of high temperature adhesives or bonding agents, may be secured using an annular seal or gasket disposed between the base member and the chimney, may be secured using clips or similar biasing members, etc.

In alternative terms, the invention is an outdoor grill vented chimney cap device comprising a tubular base member comprising an open top, an open bottom and a base member vent opening; a cap member comprising a cover member, a tubular body and a cap member vent opening positioned in said tubular body; wherein said cap member is mounted onto said base member such that said cap member is rotatable relative to said base member and such that the position of said cap member vent opening relative to said base member vent opening controls the amount of hot gases able to pass through said base member vent opening.

Likewise, an outdoor grill vented chimney cap device comprising a tubular base member having an open top, an open bottom and a base member vent opening; a cap member having a cover member, a tubular body and a cap member vent opening positioned in said tubular body; wherein said cap member is rotatably mounted onto said base member such that the position of said cap member vent opening relative to said base member vent opening determines whether said base member vent opening is fully open, partially closed or fully closed.

Likewise, an outdoor grill vented chimney cap device comprising a tubular base member having an open top, an open bottom and a plurality of base member vent openings; a cap member having a cover member, a tubular body, a tab member extending from said tubular body, and a plurality of cap member vent openings positioned in said tubular body, the number of said cap member vent openings being equal to the number of said base member vent openings; wherein said cap member is removably and rotatably mounted onto said base member such that the position of said cap member vent openings relative to said base member vent openings determines whether said base member vent opening is fully open, partially closed or fully closed.

DETAILED DESCRIPTION OF THE INVENTION

Figure 1:
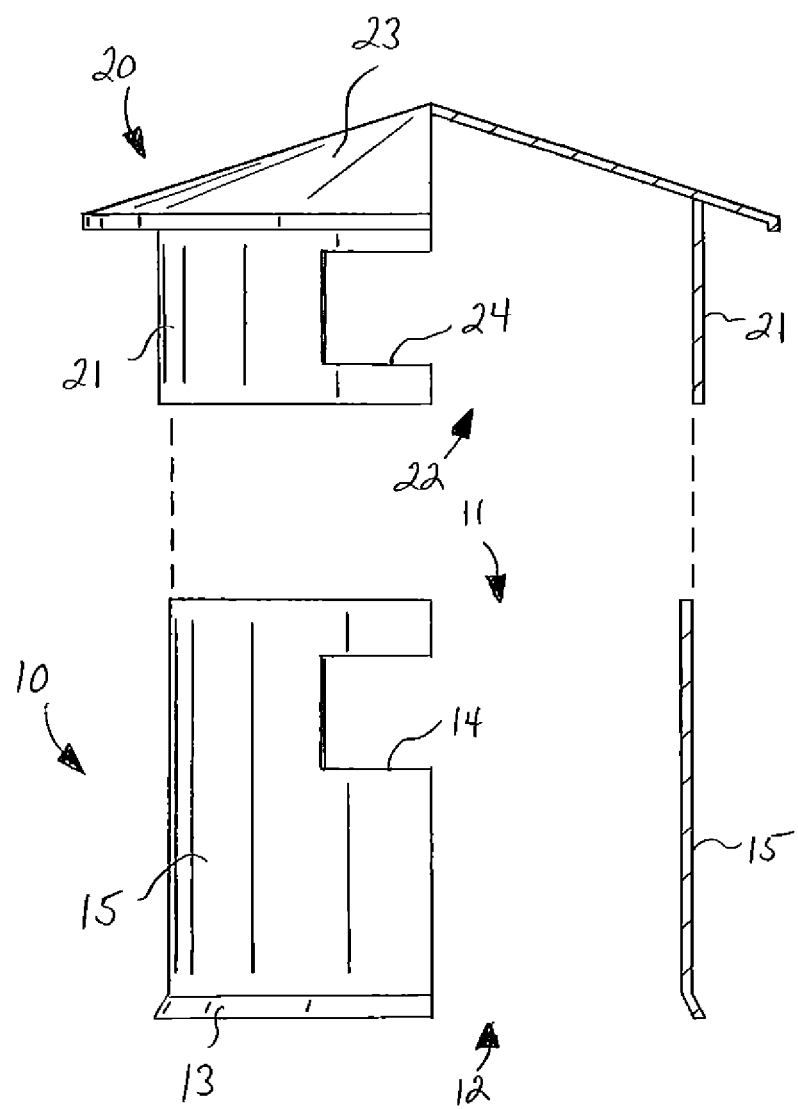
FIG. 1 is an expanded view of an embodiment of the invention, the right half being shown in cross-section.

With reference to the drawings, the invention is shown to be an adjustable vented chimney cap assembly or device for controlling the outflow of smoke and hot gases from an outdoor cooking grill having a hinged or removable cover 99 with a short tubular chimney 98, such as for example the grills sold under the BIG GREEN EGG brand. The vented chimney cap assembly is adjustable such that the outflow of smoke and gases may be adjusted from a fully open configuration to a completely closed configuration, or any degree between.

The vented chimney cap assembly comprises a base member 10 in combination with a cap member 20. The base member 10 comprises a tubular body having a side wall 15, an open top 11 and an open bottom 12. The bottom 12 may be outwardly flared or curved to define a seating configuration so as to better match the configuration of the rounded grill cover 99. One or more vent openings 14, preferably rectangular but other shapes are acceptable, are provided in the wall 15 of the base member 10.

The cap member 20 comprises a tubular body 21 having an open bottom 22 and a top cover member 23, preferably sloped or curved and having a larger diameter than the diameter of the cap main body 21 to create an overhang to better shed rain water and preclude entry of water into the vent openings 14. The cap member 20 is also provided with one or more vent openings 24, preferably with matching number and configuration to the base member vent openings 14, although the size and configuration of cap member vent openings 24 may differ from those of the base member vent openings 14. The cap member body 21 is sized to have either a slightly larger or slightly smaller diameter than the base member tubular body 10, whereby the cap member 20 can be seated onto the base member 10 such that the cap member 20 resides on the exterior of the base member 10 or the cap member 20 resides on the interior of the base member 10. Because the cap member 20 and the base member 10 are tubular, the cap member 20 may be rotated relative to the base member 10 about their common axis. The rotatable cap member 20 is preferably removable from the base member 10 for ease of cleaning and to provide a larger outlet for smoke and hot gases, which may be useful during start-up, the cross-sectional area of the base member 10b being greater than the total open area of the base member vent openings 14.

Figure 2:
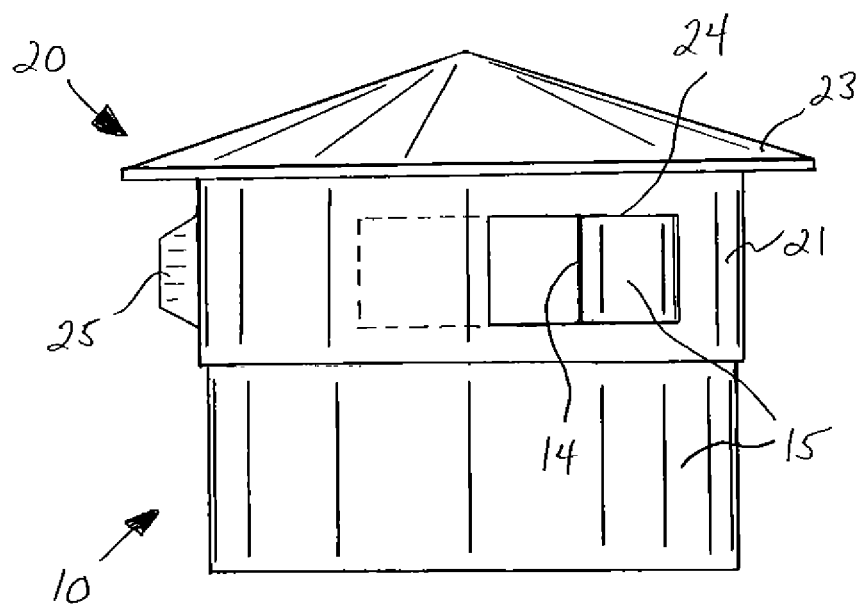
FIG. 2 is a side view of an embodiment of the invention in the assembled configuration.

The vent openings 14 and 24 on the cap member 20 and the base member 10, respectively, are aligned whereby rotation of the cap member 20 adjusts the size of the open area of the combined vent openings 14/24, i.e., rotation of the cap member 20 determines the size of the opening available for escape of hot gasses from the vented chimney cap assembly. The cap member 20 may be rotated relative to the base member 10 such that the resulting area open for passage of hot gases is maximized (the vent openings 14/24 are fully aligned) as shown in FIG. 1, or reduced (a portion of each of the base member vent openings 14 is occluded by a portion of the cap member vent openings 24) as shown in FIG. 2, or may be rotated to provide no open area at all, i.e., the vented chimney cap assembly seals the chimney 98 (the base member vent openings 14 are completely covered by solid sections of the tubular body 21 of the cap member 20). A handle or tab member 25 may be provided on the side of the vent cap tubular body 21 for easier rotation.

Figure 3:
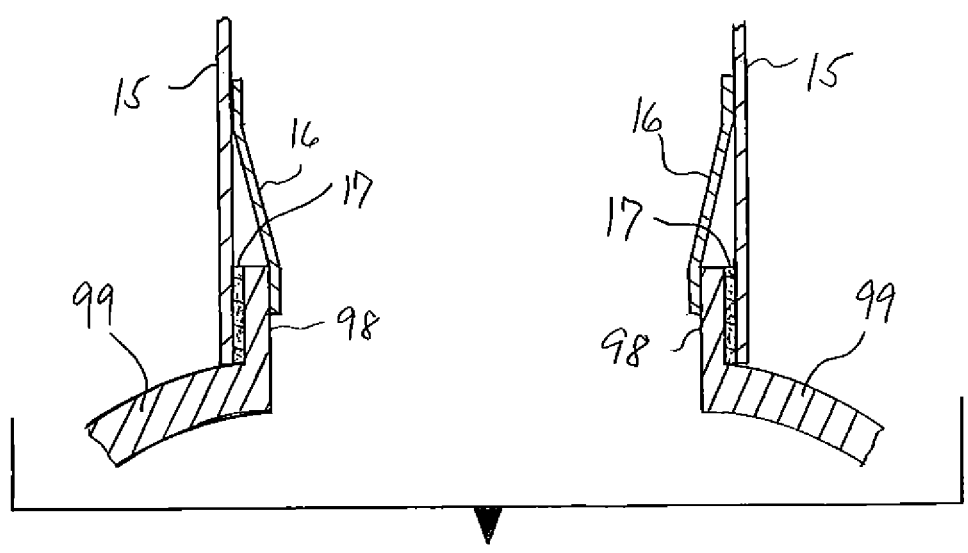
FIG. 3 is a partial midline cross-sectional view of an embodiment of the invention mounted onto a grill cover.

The open bottom 12 of the base member 10 fits over and directly onto the chimney or smokestack 98 of the grill cover 99. The base member vent openings 14 are located above the open bottom 12 a distance greater than the length of the chimney 98 so that they are not blocked by any portion of the chimney 98 once the base member 10 is placed onto the chimney 98. The vented chimney cap assembly may be permanently or removably installed on the chimney 98. The open bottom 22 may be sized to snuggly receive the grill chimney 98 to create a friction fit, may be affixed to the chimney 98 using mechanical fasteners, such as for example thumb screws, may be secured by welding, soldering or the use of high temperature adhesives or bonding agents, may be secured using an annular seal or gasket 17, made for example of a high temperature silicone gasket or a silicone rubberized fiberglass rope or felt and disposed between the base member 10 and the chimney 98, as shown in FIG. 3, may be secured using clips or similar biasing members 16 that mount onto the open top of the chimney 98, also shown in FIG. 3, etc., or a combination of these.

The vented chimney cap assembly is preferably made of a relatively thin sheet metal, such as stainless steel, but may be composed of any material suitable for high temperature and outdoor use.

It is understood that equivalents or substitutions for certain elements described above may be obvious to those of skill in the art, and therefore the true scope and definition of the invention is to be as set forth in the following claims.

I claim:

1. An outdoor grill vented chimney cap device comprising:
a tubular base member comprising an open top, an open bottom and a base member vent opening, the open bottom receiving an amount of hot gasses from a grill chimney, and the open bottom being sized and shaped to receive at least a portion of the grill chimney;
a cap member comprising a cover member, a tubular body and a cap member vent opening positioned in a side wall of said tubular body, the tubular body having a first diameter and the tubular base member having a second diameter, the first diameter being greater than the second diameter;
an annular gasket disposed within the tubular base member adjacent to the open bottom, the annular gasket being disposed between the tubular base member and the grill chimney when the tubular base member receives at least a portion of the grill chimney, and the annular gasket securing the tubular base member to the grill chimney by frictionally resisting removal of the tubular base member from the grill chimney when the tubular base member receives at least a portion of the grill chimney;
wherein said cap member is mounted onto said base member such that said cap member is rotatable relative to said base member and such that the position of said cap member vent opening relative to said base member vent opening controls the amount of hot gases able to pass through said base member vent opening and said cap member vent opening.

2. The device of claim 1, wherein said cap member is removable from said base member.

3. The device of claim 1, wherein said cap member further comprises a tab member extending from said tubular body.

4. The device of claim 1, further comprising a plurality of base member vent openings and a plurality of cap member vent openings.

5. The device of claim 1, wherein said base member further comprises a seating flange.

6. The device of claim 1, the annular gasket comprising a felt.

7. The device of claim 1, the tubular base member having a first inner radius, the grill chimney having a second outer radius, the annular gasket having a thickness, the thickness being at least as great as the difference between the first inner radius and the second outer radius.

8. An outdoor grill vented chimney cap device comprising:
a grill chimney;

a tubular base member having an open top, an open bottom and a base member vent opening, the open bottom receiving an amount of hot gasses from the grill chimney, and the open bottom being sized and shaped to receive at least a portion of the grill chimney;

a cap member having a cover member, a tubular body and a cap member vent opening positioned in a side wall of said tubular body, the tubular body having first diameter and the tubular base member having a second diameter, the first diameter being greater than the second diameter;

an annular gasket disposed within the tubular base member adjacent to the open bottom, the annular gasket being disposed between the tubular base member and the grill chimney, the annular gasket being pliant, and the annular gasket securing the tubular base member to the grill chimney by and frictionally resisting removal of the tubular base member from the grill chimney;

wherein said cap member is rotatably mounted onto said base member such that the position of said cap member vent opening relative to said base member vent opening determines whether said base member vent opening is fully open, partially closed or fully closed for controlling flow of the hot gasses.

9. The device of claim 8, wherein said cap member is removable from said base member.

10. The device of claim 8, wherein said cap member further comprises a tab member extending from said tubular body.

11. The device of claim 8, further comprising a plurality of base member vent openings and a plurality of cap member vent openings.

12. The device of claim 8, wherein said base member further comprises a seating flange.

13. The device of claim 8, the annular gasket comprising a felt.

14. The device of claim 8, the tubular base member having a first inner radius, the grill chimney having a second outer radius, the annular gasket having a thickness, the thickness being at least as great as the difference between the first inner radius and the second outer radius.

15. A vented chimney cap device on a chimney of an outdoor grill, the outdoor grill comprising a chimney through which smoke is exhausted;

the vented chimney cap device comprising:

a tubular base member having an open top, an open bottom and a plurality of base member vent openings, the open bottom receiving an amount of hot gasses;

a cap member having a cover member, a tubular body, a tab member extending from said tubular body, and a plurality of cap member vent openings positioned in a side wall of said tubular body, the tubular body having first diameter and the tubular base member having a second diameter, the first diameter being greater than the second diameter, the number of said cap member vent openings being equal to the number of said base member vent openings;

a gasket disposed within the tubular base member adjacent to the open bottom, the gasket being disposed between the tubular base member and the chimney, and the gasket securing the tubular base member to the chimney by frictionally resisting removal of the tubular base member from the grill chimney;

wherein said cap member is removably and rotatably mounted onto said base member such that the position of said cap member vent openings relative to said base member vent openings determines whether said base member vent opening is fully open, partially closed or fully closed for controlling flow of the hot gasses.

16. The device of claim 15, wherein said base member further comprises a seating flange.

17. The device of claim 15, the gasket comprising a felt.

18. The device of claim 15, the tubular base member having a first inner radius, the chimney having a second outer radius, the gasket having a thickness, the thickness being at least as great as the difference between the first inner radius and the second outer radius.

\* \* \* \* \*